(12) United States Patent
Stanzel et al.

(10) Patent No.: US 10,183,352 B2
(45) Date of Patent: Jan. 22, 2019

(54) WELDING WIRE FEED SPEED CONTROL SYSTEM AND METHOD

(71) Applicant: Illinois Tool Works Inc., Glenview, IL (US)

(72) Inventors: Kenneth A. Stanzel, Appleton, WI (US); Bernard J. Vogel, Troy, OH (US); Chris Roehl, Appleton, WI (US); Kelley Morrow, De Land, FL (US)

(73) Assignee: Illinois Tool Works Inc., Glenview, IL (US)

( * ) Notice: Subject to any disclaimer, the term of this patent is extended or adjusted under 35 U.S.C. 154(b) by 151 days.

(21) Appl. No.: 14/075,599

(22) Filed: Nov. 8, 2013

(65) Prior Publication Data

US 2014/0061176 A1    Mar. 6, 2014

Related U.S. Application Data

(63) Continuation of application No. 11/348,168, filed on Feb. 6, 2006, now Pat. No. 8,604,389.

(51) Int. Cl.
  *B23K 9/10* (2006.01)
  *B23K 9/095* (2006.01)
  *B23K 9/12* (2006.01)

(52) U.S. Cl.
  CPC .......... *B23K 9/0953* (2013.01); *B23K 9/1062* (2013.01); *B23K 9/1087* (2013.01); *B23K 9/124* (2013.01)

(58) Field of Classification Search
  CPC ........ B23K 9/10; B23K 9/095; B23K 9/1006; B23K 9/32

(Continued)

(56) References Cited

U.S. PATENT DOCUMENTS 2,424,324 A    7/1947  Murcek
3,125,671 A    3/1964  Manz
(Continued)

FOREIGN PATENT DOCUMENTS

DE    9301390    4/1993
DE   19733638    2/1999
(Continued)

OTHER PUBLICATIONS

International Search Report from PCT application No. PCT/US2016/018695, dated Jun. 22, 2016, 13 pgs.

(Continued)

*Primary Examiner* — Dana Ross
*Assistant Examiner* — Ayub Maye
(74) *Attorney, Agent, or Firm* — McAndrews, Held & Malloy, Ltd.

(57) ABSTRACT

A welding system is disclosed in which the rate of advancement of wire electrode is determined automatically. The device can include a control circuit that determines the rate of advancement of the wire electrode in response to a signal from the voltage selection device of the welding system. Depending upon the operator selected voltage which is selected via the voltage selection device, the control circuit will determine the appropriate rate of wire electrode advancement and control the advancement mechanism (e.g., electric motor) accordingly. Linking of the voltage level and wire-feed speed controls facilities easy of use for more novice operators and, furthermore, facilitates single-handed adjustment of two operational parameters during a welding process.

17 Claims, 3 Drawing Sheets

(58) Field of Classification Search
USPC .......... 219/130.1, 130.01, 137.7, 137.71
See application file for complete search history.

(56) References Cited

U.S. PATENT DOCUMENTS

| | | | |
|---|---|---|---|
| 3,555,239 A | | 1/1971 | Kerth |
| 3,924,094 A | * | 12/1975 | Hansen ................ B23K 9/1274 219/124.32 |
| 4,093,844 A | | 6/1978 | Fellure |
| 4,438,317 A | | 3/1984 | Ueguri |
| 4,510,373 A | | 4/1985 | Cox |
| 4,608,482 A | | 8/1986 | Cox |
| 4,721,947 A | | 1/1988 | Brown |
| 4,973,821 A | | 11/1990 | Martin |
| 5,043,554 A | | 8/1991 | Kohsaka |
| 5,278,390 A | | 1/1994 | Blankenship |
| 5,643,479 A | * | 7/1997 | Lloyd .................... B23K 9/092 219/130.51 |
| 6,091,048 A | | 7/2000 | Lanouette |
| 6,166,350 A | | 12/2000 | Sickels |
| 6,167,328 A | | 12/2000 | Takaoka |
| 6,476,354 B1 | | 11/2002 | Jank |
| 6,649,870 B1 | | 11/2003 | Barton |
| 6,735,540 B2 | | 5/2004 | Pedrazzini |
| 6,744,011 B1 | * | 6/2004 | Hu ......................... B23K 31/12 219/130.01 |
| 6,930,280 B2 | | 8/2005 | Zauner |
| 7,220,941 B2 | * | 5/2007 | Niedereder .......... B23K 9/1056 219/130.5 |
| 7,291,808 B2 | * | 11/2007 | Burgstaller .......... B23K 9/1087 219/130.01 |
| 7,388,171 B2 | * | 6/2008 | Morimoto ................ B23K 9/32 219/108 |
| 8,546,728 B2 | | 10/2013 | Sickels |
| 2001/0047987 A1 | | 12/2001 | Nowak |
| 2004/0004064 A1 | | 1/2004 | Lanouette |
| 2004/0020911 A1 | | 2/2004 | Centner |
| 2004/0095704 A1 | | 5/2004 | Cigelske |
| 2004/0099648 A1 | | 5/2004 | Hu |
| 2004/0129759 A1 | | 7/2004 | Rouault |
| 2004/0173591 A1 | | 9/2004 | Knoener |
| 2004/0226930 A1 | | 11/2004 | Radtke |
| 2005/0000946 A1 | * | 1/2005 | Albrecht ................ B23K 9/173 219/74 |
| 2005/0016979 A1 | | 1/2005 | Stein |
| 2005/0045608 A1 | | 3/2005 | Sykes |
| 2005/0045611 A1 | | 3/2005 | Lhde |
| 2005/0161448 A1 | | 7/2005 | Stava |
| 2005/0173393 A1 | | 8/2005 | Nowak |
| 2007/0155347 A1 | | 7/2007 | Heuermann |
| 2009/0152251 A1 | | 6/2009 | Dantinne |
| 2009/0173726 A1 | | 7/2009 | Davidson |
| 2009/0277893 A1 | | 11/2009 | Speilman |
| 2010/0314370 A1 | | 12/2010 | Granato |
| 2011/0049116 A1 | | 3/2011 | Rappl |
| 2012/0241429 A1 | | 9/2012 | Knoener |

FOREIGN PATENT DOCUMENTS

| | | |
|---|---|---|
| EP | 0901865 A2 | 3/1999 |
| EP | 0987079 A2 | 3/2000 |
| EP | 1445055 A1 | 8/2004 |
| EP | 1512480 A2 | 3/2005 |
| EP | 1559496 A1 | 8/2005 |
| FR | 2836641 A1 | 9/2003 |

OTHER PUBLICATIONS

International Search Report from PCT application No. PCT/US2016/022064, dated Jun. 29, 2016, 12 pgs.

* cited by examiner

WELDING WIRE FEED SPEED CONTROL SYSTEM AND METHOD

CROSS-REFERENCE TO RELATED APPLICATIONS

This application is a Continuation Application of U.S. patent application Ser. No. 11/348,168, entitled "Welding Wire Feed Speed Control System and Method", filed Feb. 6, 2006, which is herein incorporated by reference in its entirety for all purposes.

BACKGROUND

The present invention relates generally to wire-feed welding devices and, in certain embodiments, to methods and apparatus for controlling wire electrode advancement.

A common metal welding technique employs the heat generated by electrical arcing to transition a workpiece to a molten state, to facilitate a welding process. One technique that employs this arcing principle is wire-feed welding. At its essence, wire-feed welding involves routing welding current from a power source into an electrode that is brought into close proximity with the workpiece. When close enough, current arcs from the electrode to the workpiece, completing a circuit and generating sufficient heat to weld the workpiece. Often, the electrode is consumed and becomes part of the weld itself. Thus, new wire electrode is advanced, replacing the consumed electrode and maintaining the welding arc. If the welding device is properly adjusted, the wire-feed advancement and arcing cycle progresses smoothly, providing a good weld.

Traditionally, during a welding operation, an operator selects the level and types of resources provided to the weld location, depending, of course, on the particulars of the weld and the materials being welded. For instance, an operator may select between various kinds and sizes of wire electrode, ranging from the diameter of wire the electrode to the material the wire electrode is made of. Different kinds of wire electrode, however, perform well at different operational settings of the welding device. That is, different kinds of wire electrodes perform well within different voltage ranges and wire-feed speeds, for instance. For example, a given 0.023 inch mild-steel wire electrode may well perform at 17 Volts and with a wire-feed speed of 250 inches per minute, while a 0.035 inch mild steel wire electrode well performs at 19 Volts with a wire-feed speed of 230 inches per minute.

Conventionally, welding devices rely on the knowledge and acumen of the operator to select the most appropriate voltage and wire feed settings for the wire electrode being used and weld conditions. Unfortunately, in many cases, the weld operator is a novice to field, especially in the case of portable welding devices. If the operator does not properly adjust the voltage and wire-feed speed settings, the arcing may not be sufficient to produce a good weld, or a weld at all. Furthermore, in traditional devices, the wire-feed speed control and the voltage control are wholly independent from one another, thus making it difficult for the operator to adjust the both parameters while a weld is progressing.

Therefore, there exists a need for improved apparatus and methods for the control of wire-feed welding devices.

BRIEF DESCRIPTION

In accordance with one embodiment, the present technique provides a welding system in which the rate of advancement of wire electrode is determined automatically. For example, the device can include a control circuit that determines the rate of advancement of the wire electrode in response to a signal from the voltage selection device of the welding system. Thus, depending upon the operator selected voltage—which is selected via a voltage selection device—the control circuit will determine the appropriate rate of wire electrode advancement and control the advancement mechanism (e.g., electric motor) accordingly. Advantageously, linking the voltage level and wire-feed speed controls facilities easy of use for more novice operators and, furthermore, facilitates single-handed adjustment of two operational parameters during a welding process, for instance.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
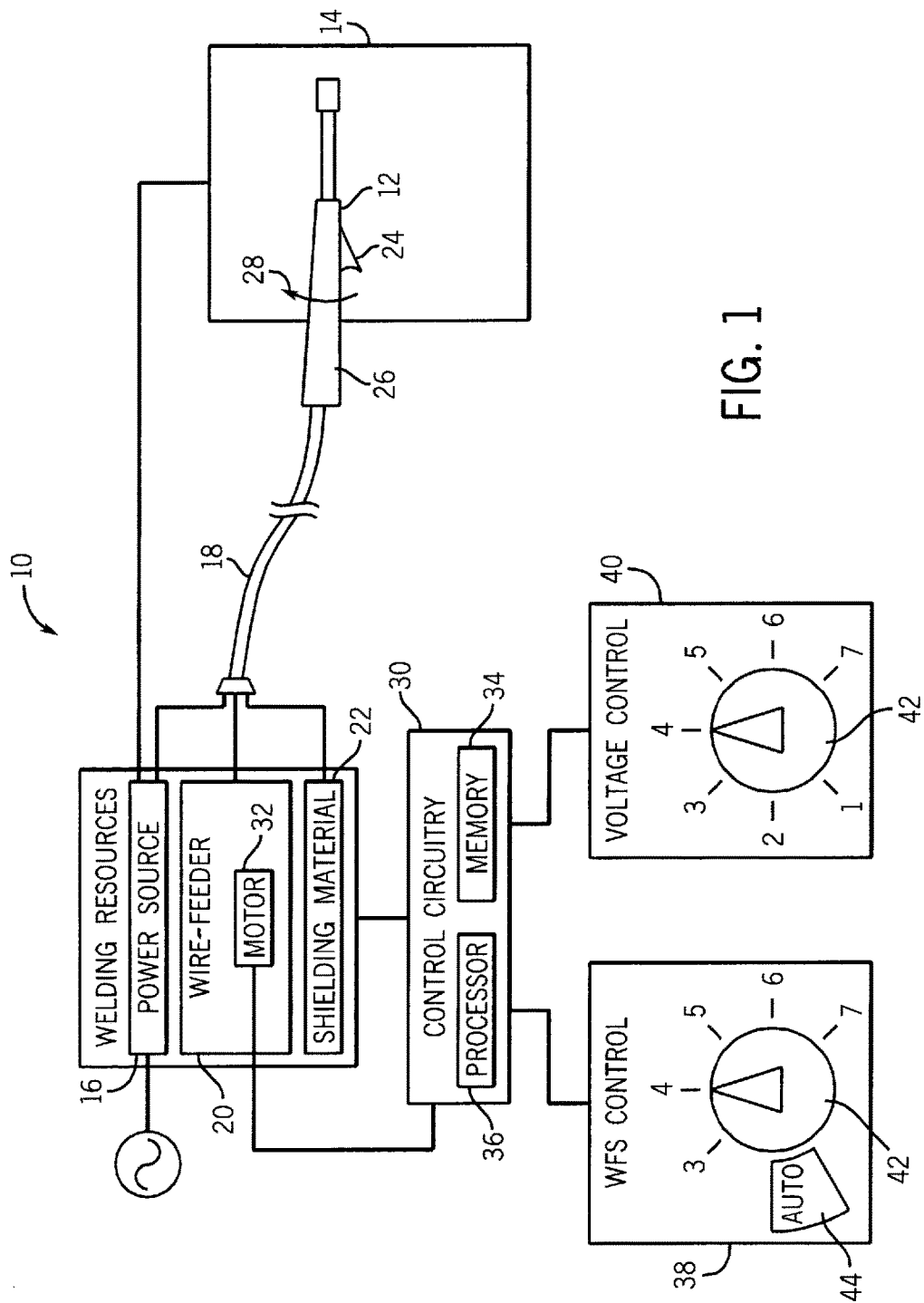
FIG. 1 is a diagrammatic representation of a wire-feed welding system, in accordance with an exemplary embodiment of the present technique.

As discussed in detail below, the present technique, in accordance with certain embodiments, provides method and apparatus for controlling the advancement of wire electrode in a welding device. For example, a metal-inert-gas (MIG) welding system incorporating the present technique can include an "AUTO" setting that links the wire-feed speed to the voltage-level or vice-versa. Thus, in such a system, if an operator were to adjust the voltage to the wire electrode, the wire-feed speed would be automatically adjusted to accommodate the new voltage setting. Alternatively, the selected wire-feed speed can automatically determine an output voltage level. Advantageously, the linked relationship between the voltage-level control and the wire-feed control can assist an operator in obtaining desirable performance and, furthermore, can facilitate multifunctional control of the welding device via a single input knob. FIG. 1 illustrates an exemplary welding system that includes an embodiment of this wire-feed control technique. Indeed, the system 10 may be for portable use, and such systems are often stationed by less-experienced operators. However, prior to continuing, it is worth noting that the following discussion merely relates to exemplary embodiments of the present technique. Thus, the appended claims should not be viewed as limited to those embodiments described herein.

Returning to the exemplary welding system 10, it includes a welding torch 12 that defines the location of the welding operation with respect to a workpiece 14. Placement of the welding torch 12 at a location proximate to the workpiece 14 allows electrical current provided by a power source 16—which converts incoming alternating current (ac) power to an appropriate direct current (dc) power—and routed to the welding torch 12 via a welding torch cable 18, to arc from the welding torch 12 to the workpiece 14. In summary, this arcing completes an electrical circuit from the power source 16, to the welding torch 12 via the welding torch cable 18, to a wire electrode, to the workpiece 14, and, at its conclusion, back to the power source 16, generally to ground. Advantageously, this arcing generates a relatively large amount of heat causing the workpiece 14 and/or filler metal to transition to a molten state, facilitating the weld.

To produce electrical arcing, the exemplary system 10 includes a wire-feeder 20 that provides a consumable wire electrode to the welding torch cable 18 and, in turn, to the welding torch 12. The welding torch 12 conducts electrical current to the wire electrode via a contact tip (not shown) located in the neck assembly, leading to arcing between the egressing wire electrode and the workpiece 14.

To shield the weld area from contaminants during welding, to enhance arc performance, and to improve the resulting weld, the exemplary system 10 includes a gas source 22 that feeds an inert, shielding gas to the welding torch 12 via the welding torch cable 18. It is worth noting, however, that a variety of shielding materials, including various fluids and particulate solids, may be employed to protect the weld location. Additionally, certain wire electrodes are designed to operate without a shielding material.

Advancement of these welding resources (e.g., welding current, wire-electrode, and shielding gas) is effectuated by actuation of a trigger 24 secured to a handle 26. By depressing the trigger 24 (arrow 28), a switch disposed within the trigger 24 is closed, causing the transmission of an electrical signal that commands promotion of the welding resources into the welding torch cable 18. For example, depressing the trigger 24 sends a signal to the control circuitry 30, which, in turn, activates a motor 32 that advances wire electrode into the welding torch cable 18, opens a valve to allow the flow of shielding material, and commands the power source to output the desired level of power to the wire electrode. Advantageously, the control circuitry 30 includes memory components 34, to store programming instructions, command programs, appropriate data, etc. The control circuitry 30 also includes a processing device, such as a processor 36, a programming logic circuit (PLC), among others types of devices, to effectuate control of the welding system 10.

To adjust operating parameters of the welding system 10, a pair of input devices are provided: a wire-feed speed controller 38 and a voltage controller 40. As illustrated, these input devices are potentiometer devices (i.e., POTS); however, other kinds of input devices, such as keypads, are envisaged. Each POT controller comprises a knob 42 that is positionable between indexed locations that correspond with certain operational parameters. For example, in the illustrated welding system 10, the power source 16 outputs power within the operational range of ten to forty volts. An operator can control the output voltage to the wire electrode by turning the knob 42 on the voltage controller 40 between the indexed positions, which are labeled from "1" to "7". If a voltage closer to 40 V is desired, the knob 42 can be turned toward the "7" position. Conversely, if less output voltage is desired, the knob 42 on the voltage controller 40 can be turned toward the "1" position. Similarly, the wire-feed speed of the system 10 can be adjusted by rotating the knob 42 of the wire-feed speed controller 38 between the "3" and "7" positions, with the "3" position being a lowest operating wire-feed speed (e.g., 75 inches per minute) and "7" being the fastest (e.g., 1400 inches per minute).

When left in a manual mode, the operator relies on his or her welding acumen to select the appropriate voltage-level and wire-feed speed settings, based on the type of weld to be made, the kind and size of the wire electrode, among other relevant factors. Many operators, however, may not have the breadth of experience and knowledge generally beneficial to make such decisions. Resultantly, maladjustment of the welding system 10 is possible. For example, if the wire-feed speed setting is too slow in comparison to the voltage level setting, then an arc may not form or may extinguish prematurely. Conversely, if the wire-feed speed setting is too fast for the given voltage level setting, then the quality of the weld may be reduced. Additionally, when the system is in a manual mode, an operator may benefit from adjustments in the voltage setting, which, in turn, benefits from adjustments in the wire-feed speed setting. Unfortunately, in a manual mode, the operator may find it difficult to maintain the arc by depressing the trigger 24 while concurrently manipulating both the wire-feed speed controller 38 and the voltage controller 40.

Figure 2:
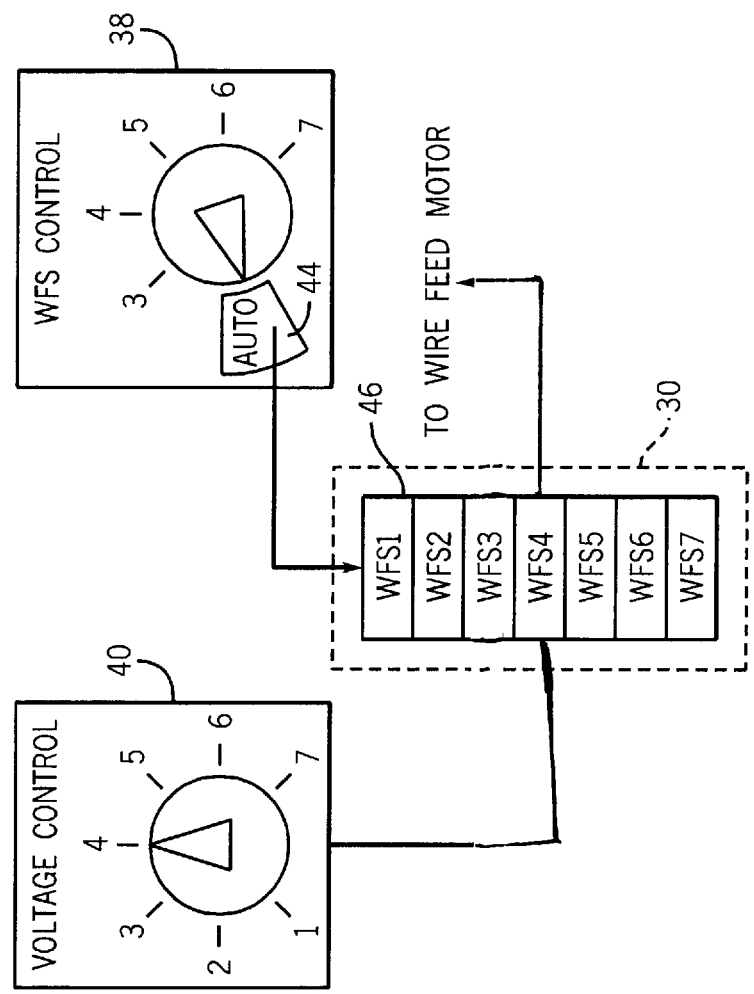
FIG. 2 is a schematic representation of a wire-feed welding system control, in accordance with an exemplary embodiment of the present technique.

To alleviate such concerns, the exemplary welding system 10 includes an "AUTO" setting 44 on the wire-feed speed controller 38. As illustrated in FIG. 2, placement of the wire-feed speed controller 38 at the "AUTO" setting 44 transitions the welding system 10 from a manual mode to a more automated mode. For example, by selecting the "AUTO" setting 44, the control circuitry 30 automatically links the voltage level setting and the wire-feed speed setting, automatically adjusting the wire-feed speed setting based on the selected voltage level setting. As illustrated, when the voltage controller 40 is placed at the "4" location, the control circuitry 30, in cooperation with its processor 36 and data stored in the memory 34, determines the appropriate wire-feed speed setting, in this case the wire-feed setting corresponding to a voltage level setting of "4." This correlation can be made via the use of a look-up table 46 stored in the memory 34, or can be made via the use of an appropriate algorithm, among various other techniques for correlation.

Also, the "AUTO" setting may be found on the voltage control, the system determining a wire-feed speed based on selected voltage level.

During operation, the operator may determine that a more appropriate voltage setting is desired, adjusting the voltage controller 40 setting to the "3" position, for instance. In turn, the control circuitry 30 will determine the appropriate wire-feed speed setting—based on the look-up table 46 or a stored algorithm, for example—and instruct to wire-feed motor 32 to operate at this designated speed. Advantageously, the operator can adjust both the wire-feed speed and voltage level parameters through the manipulation of a single knob 42 on the voltage controller 40.

Figure 3:
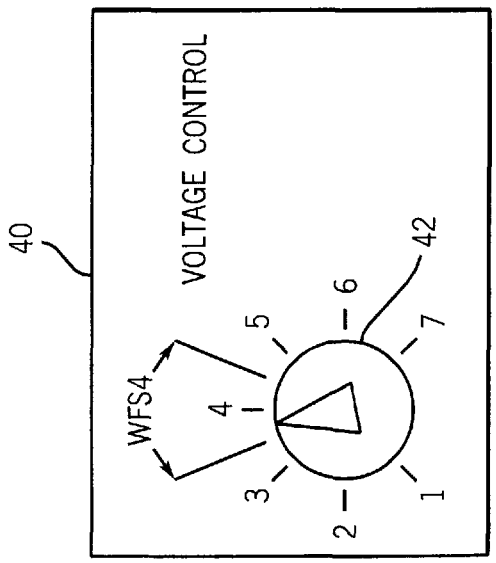
FIG. 3 is a diagrammatic representation of a wire-feed welding system control, in accordance with an exemplary embodiment of the present technique.

Turning to FIG. 3, this figure represents a wire-feed speed control scheme for a voltage controller 40 essentially having an infinite number of voltage settings between the "1" and "7" positions. With this controller 40, an operator may select from an essentially infinite number of voltage settings in the operational range of the welding system 10 simply by slightly adjusting or "tweaking" the position of the knob 42. However, the wire-feed speed setting, when the controller 38 is in the "AUTO" position, is automatically selected based on the range of values the voltage controller 40 is within. For example, the illustrated voltage controller 40 is set at a position slightly beyond the midpoint between the "3" and "4" settings. At this voltage setting, the control circuitry 30 determines that the wire-feed speed setting corresponding to a voltage setting of "4", which may be gleaned from the look-up table 46, is to be applied. In fact, as illustrated, the control circuitry 30 commands the wire-feed motor 32 to operate at the wire-feed speed corresponding to a voltage level setting of "4" if the voltage control is set at or beyond the mid-point between the "3" and "4" settings, and at or before the mid-point between the "4" and "5" settings. This wire-feed speed setting scheme can be, of course, extended to the other voltage settings. For instance, the wire-feed speed setting for the voltage level setting of "4" may be applied when the voltage controller 40 is set at a location at or beyond the "4" setting but at or before the "5" setting. Alternatively, and by way of example, the wire-feed speed setting may be based on an algorithm, thus providing an automatically determined wire-feed speed essentially for each possible voltage setting between the "1" and "7" positions.

Figure 4:
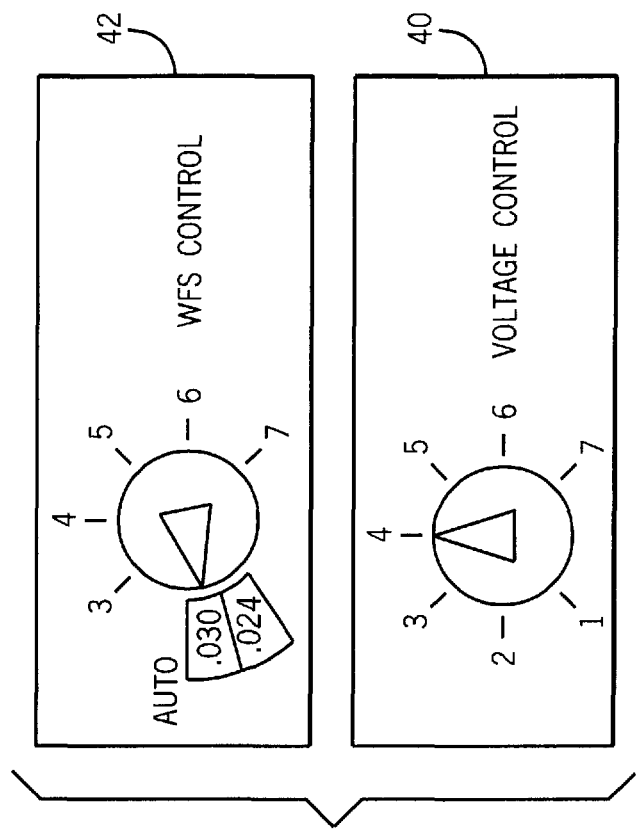
FIG. 4 is a diagrammatic representation of a wire-feed welding system control panel, in accordance with an exemplary embodiment of the present technique.

FIG. 4 represents yet another alternative, exemplary mechanism for coupled control of the wire-feed speed and voltage level. As illustrated, the "AUTO" setting on the wire-feed speed controller 42 is segregated into two sub-sections, each for a different kind or size of welding wire. By way of example, one sub-section corresponds to a mild steel wire electrode having a diameter of 0.030 inches and the other corresponds to a mild steel wire electrode having a diameter of 0.024 inches, for example. It is, however, worth noting that the "AUTO" section can be divided into any number of sub-section, each corresponding to a different type or size of wire electrode. Depending upon the sub-section selected, the advancement rate of the wire electrode for a given voltage setting is changed. For example, if the wire-feed speed controller 42 is placed at the "0.030" setting, the control circuitry 30 will select from a first look-up table that corresponds with the 0.30 inch wire electrode to determine the wire-feed speed for the given voltage setting. Moreover, as the voltage setting is changed, the control circuit will remain within the first look-up table, selecting the wire-feed speed corresponding to the newly selected voltage. However, if the wire-feed speed controller is placed at the "0.024" setting, the control circuitry 30 will look to a second, different look-up table to select the wire-feed setting for the given voltage setting. Moreover, as the voltage setting is changed, the control circuitry 30 will remain within this second look-up table, selecting the wire-feed speed corresponding to the newly selected voltage. Thus, the operator can automate the wire-feed setting selection to best suit the type of wire electrode employed. Of course, the wire-feed speed, rather than being selected from a look-up table, can be determined based on an appropriate algorithm, each algorithm corresponding to the type and kind of wire electrode employed, among other techniques. Where desired, a further input device may be provided for selecting which wire size or electrode type is being used. In certain implementations, the same input device may provide multiple positions or selection settings, certain of them corresponding to specific sizes or types of electrodes.

As a further alternative, an input device that functions along with or in place of knob 40 may be employed directly on the welding torch. For example, an adjustment knob or button (e.g., a rocker switch) might be provided on the handle of the welding torch itself. Where desired, a signal then is taken from a conductor extending to the switch that is interpreted by the controller. The effect of the signal may be to increase and decrease the applied voltage, with wire feed speed being controlled as a function of the voltage, or vice versa. Such an arrangement would permit adjustments to the voltage and wire feed speed to be made while a welder is working remotely from the base unit, such as at the position of a workpiece or work area, without interrupting the work to return to the base unit.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
   a power source configured to provide welding power to a welding torch;
   a wire feeder configured to advance wire electrode into the welding torch at a rate of advancement;
   a user interface comprising:
      a first input element configured to receive an input to adjust a setting corresponding to a voltage output level for the power source; and
      a second input element configured to receive an input to adjust a setting corresponding to the rate of advancement and to alternatively receive an input relating to a setting that corresponds to an automatic adjustment mode for wire feed speed adjustment, wherein the first and second input elements are each single input elements of the user interface; and
   control circuitry comprising a processor configured to execute programming instructions stored on a memory, wherein the programming instructions include instructions for:
      receiving signals from the first input element corresponding to a selected setting of the first input element;
      receiving signals from the second input element corresponding to a selected setting of the second input element;
      setting the voltage output level of the power source corresponding to the selected setting of the first input element;
      automatically determining and setting the rate of advancement based on the selected voltage output level when the selected setting of the second input element corresponds to the automatic adjustment mode;
      controlling the wire feeder to advance the wire electrode into the welding torch at the determined and set rate of advancement when the selected setting of the second input element corresponds to the automatic adjustment mode; and
      setting the rate of advancement corresponding to the selected setting of the second input element when the selected setting of the second input element does not correspond to the automatic adjustment mode.

2. The welding system of claim 1, wherein the control circuitry determines the rate of advancement when the selected setting of the second input element corresponds to the automatic adjustment mode by looking up a pre-determined value corresponding to the selected setting of the first input element in a lookup table stored in the memory.

3. The welding system of claim 1, wherein the control circuitry determines the rate of advancement when the selected setting of the second input element corresponds to the automatic adjustment mode using algorithms stored in the memory.

4. The welding system of claim 1, comprising a third input element disposed on the welding torch, wherein settings of the third input element correspond to the automatic adjustment mode.

5. The welding system of claim 1, wherein the second input element comprises a plurality of selectable settings that correspond to the automatic adjustment mode, wherein each of the selectable settings corresponds to a size of the wire electrode.

6. The welding system of claim 1, wherein the first input element comprises a plurality of indexed positions, each indexed position corresponding to a predetermined voltage range and a pre-determined rate of advancement.

7. The welding system of claim 1, wherein both the first and second input elements comprise an adjustment knob.

8. The welding system of claim 4, wherein the programming instructions include instructions for:
   receiving signals from the third input element corresponding to a selected setting of the third input element; and
   automatically determining and setting the voltage output level of the power source and the rate of advancement based at least in part on the selected setting of the third input element.

9. The welding system of claim 4, wherein the third input element comprises a switch.

10. The welding system of claim 5, wherein the programming instructions include instructions for:
    automatically determining and setting the voltage output level of the power source based at least in part on the selected setting of the first input element and the size of the wire electrode when the selected setting of the second input element corresponds to the automatic adjustment mode; and
    automatically determining and setting the rate of advancement based at least in part on the selected setting of the first input element and the size of the wire electrode when the selected setting of the second input element corresponds to the automatic adjustment mode.

11. The welding system of claim 6, wherein each indexed position comprises a selectable voltage output level within the predetermined voltage range.

12. A welding system, comprising:
    a power source configured to output power within a range of output power levels;
    an advancement mechanism configured to advance a wire electrode into a welding torch of the welding system at a rate of advancement;
    a user interface comprising:
        a first input element configured to receive a voltage selection and that is operable in an auto mode to select the rate of advancement; and
        a second input element configured to receive a plurality of wire feed speed settings and to alternatively receive an automatic setting to enter the auto mode, wherein the first and second input elements are each single input elements of the user interface; and
    a control circuit configured to:
        set the rate of advancement based at least in part on a selected wire feed speed setting when the auto mode is not selected via the second input element;
        determine and set the rate of advancement based at least in part on the voltage selection received via the first input element when the auto mode is selected via the second input element; and
        control the advancement mechanism to advance the wire electrode into the welding torch at the determined and set rate of advancement when the selected setting of the second input element corresponds to the automatic adjustment mode.

13. The welding system of claim 12, wherein the control circuit determines a single output power level from one or a plurality of indexed positions on the first input element.

14. The welding system of claim 12, wherein the first input element is provided on the welding torch.

15. The welding system of claim 12, wherein the power source, the first input element, the second input element, the advancement mechanism, the control circuit, and the power source are disposed in a single housing.

16. The welding system of claim 12, wherein the control circuit comprises a processing device and a memory component in communication with the processing device, the memory component storing data correlating output power levels with rates of advancement for wire electrodes.

17. The welding system of claim 12, wherein the control circuit is configured to determine a first output level of the power source based at least in part on first parameter data of a first wire electrode and the rate of advancement, and to determine a second output level of the power source based at least in part on a second parameter data of a second wire electrode and the rate of advancement, wherein the first and second wire electrodes are different from one another.

* * * * *